United States Patent
Ishigami et al.

[11] Patent Number: 5,197,277
[45] Date of Patent: Mar. 30, 1993

[54] GASIFICATION-TYPE COMBINED ELECTRIC POWER GENERATING PLANT

[75] Inventors: Shigeyasu Ishigami; Takaaki Furuya, both of Tokyo, Japan

[73] Assignee: Mitsubishi Jukogyo Kabushiki Kaisha, Tokyo, Japan

[21] Appl. No.: 849,335

[22] Filed: Mar. 10, 1992

[30] Foreign Application Priority Data

Mar. 11, 1991 [JP] Japan .................................. 3-44884

[51] Int. Cl.$^5$ .......................... F02B 43/00; F02G 3/00
[52] U.S. Cl. .................................................. 60/39.12
[58] Field of Search ............... 60/39.12, 39.02, 39.182, 60/39.464

[56] References Cited

U.S. PATENT DOCUMENTS

| | | | |
|---|---|---|---|
| 4,085,578 | 4/1978 | Kydd ................................ | 60/39.02 |
| 4,099,374 | 7/1978 | Foster-Pegg ..................... | 60/39.12 |
| 4,132,065 | 1/1979 | McGann ........................... | 60/39.12 |
| 4,238,923 | 12/1980 | Waryasz ........................... | 60/39.12 |
| 4,288,979 | 9/1981 | Liljedahl et al. ................. | 60/39.12 |
| 4,410,336 | 10/1983 | Blaskowski ...................... | 60/39.182 |
| 4,974,412 | 12/1990 | Schneider ........................ | 60/39.182 |
| 5,078,752 | 1/1992 | Mach et al. ...................... | 60/39.12 |

*Primary Examiner*—Richard A. Bertsch
*Assistant Examiner*—Howard R. Richman
*Attorney, Agent, or Firm*—Wenderoth, Lind & Ponack

[57] ABSTRACT

A gasification-type combined electric power generating plant comprises a gasifying furnace, a heat exchanger, a gas purifying device, a gas turbine, and a gas turbine compressor, an exhaust heat recovering boiler, and a steam turbine. To decrease boosting power, increase the energy of recovered heat, and improve the overall efficiency of the plant, the plant further includes a regenerative heat exchanger for cooling an air-like gas bled from the gas turbine compressor, a cooler for cooling the air-like gas passed through the regenerative heat exchanger, a primary air booster for boosting a part of the air-like gas passed through the cooler to deliver a primary air, a secondary air booster for boosting the remainder of the air-like gas passed through the cooler to deliver a secondary air, and a passage through which the secondary air passed through the secondary air booster is supplied to the regenerative heat exchanger where the secondary air is heated and then to the gasifying furnace.

3 Claims, 4 Drawing Sheets

GASIFICATION-TYPE COMBINED ELECTRIC POWER GENERATING PLANT

BACKGROUND OF THE INVENTION

1. Field of the Invention

This invention relates to a gasification-type combined electric power generating plant which generates electricity using a gasifying furnace supplied with fuel (such as coal or heavy oil), a gas turbine, and a steam turbine.

2. Description of the Prior Art

FIG. 4 shows a conventional gasification-type combined electric power generating plant which uses coal (pulverized coal) as fuel.

In this drawing, the coal-gasification-type combined electric power generating plant comprises a gasifying furnace 1 for performing partial oxidation under high-temperature and high-pressure conditions, a heat exchanger 2 for recovering the sensible heat of a high-temperature fuel gas generated, a gas purifying device 3 for eliminating minor pollutive components and dust out of the fuel gas generated, a gas turbine 4 driven upon combustion of the purified fuel gas, an exhaust heat recovering boiler 5 for recovering the heat of the high-temperature gas at the outlet of the gas turbine, and a steam turbine 6 driven by the steam generated by the recovered heat.

Air (inclusive of a gasifying agent, oxygen-containing gas, etc.) to be supplied to the gasifying furnace 1 is bled from a gas turbine compressor 4a, and boosted by a secondary air booster 9 to predetermined pressure for a primary air 14 and secondary air 13 used in the gasifying furnace 1. Before boosting, the gasifying agent is cooled in an air cooler 32 by low-pressure feed water 17 or the like for the purpose of increasing the efficiency of compression, and after boosting, the secondary air 13 is heated in an air heater 31 by bleed air 33 from the steam turbine 6, and then supplied to the gasifying furnace 1. At the time of startup, the primary air and the secondary air are boosted by a starting compressor 55 to a predetermined high pressure for the primary air.

In FIG. 4, 4b is an output section of the gas turbine 4, 8 an air cooler, 9 the secondary air booster (which also boosts the primary air), 11 a primary air cooler, 12 a coal supply device, 14 the primary air, 15 a condenser, 16 a condensate pump, 18 a feed water pump, 19 a high-pressure feed water, 20 the main steam of the gasifying furnace, 21 high-pressure main steam, 22 reheat steam, 23 low-pressure steam, 24 a chimney, 56 an air heater, and 57 an air cooler.

For convenience of illustration, the primary air 14, for example, represents the primary air itself and the supply passage thereof. That is, the passage of the primary air is not illustrated in a separate form. This manner of illustration is applied to the bleed air 33 and the like, and to embodiments described later.

The conventional gasification-type combined electric power plant has the following problems to be solved:

(a) Since the bleed temperature of the gas turbine compressor is high (on the order of 300° to 400° C.), even when heat recovery is performed by cooling with a low-temperature feed water of low pressure (on the order of 30° to 60° C.), the temperature drop is large and the energy decrease is significant, leading to poor heat recovery.

(b) Since the air (inclusive of gasifying agent, oxygen-containing gas, etc.) after boosting is heated by the turbine bleed air of high energy although the heat-gas efficiency of the gasifying furnace and the power generation efficiency of the gas turbine are increased a little, the bottom cycle efficiency of the water-steam system is decreased.

(c) Since only one booster is used to boost the primary and secondary air, the pressure loss arising in controlling the air to each predetermined pressure is large, demanding an increase in necessary power.

(d) Since the starting compressor is switched to handle either a rated load or a large load, its power and pump head must be compatible with the predetermined pressure, flow rate and temperature of the gasifying furnace under rated or large load conditions, resulting in size enlargement.

(e) To attain a predetermined temperature demanded by the gasifying furnace, there must be provided an air cooler and an air heater.

(f) To replace the starting compressor after the starting of the gas turbine, there must be provided a blow-off switching device of large size and high differential pressure.

In this connection, Japanese Patent Laid-Open No. 62-186018 discloses a system wherein compressed air bled from a gas turbine compressor is subjected, in a regenerative heat exchanger, to heat exchange with another compressed air from the outlet of a booster and then supplied to a gasifying furnace. In such a gasifying furnace for partially oxidizing a carbon-containing fuel (such as coal or heavy oil), however, an oxygen-containing gas such as the compressed air serves as a gasifying agent and functions (in the form of primary air) to convey coal into the gasifying furnace, or spray heavy oil into the gasifying furnace. Therefore, the booster must have a high pressure ratio because a large pressure loss is caused by coal conveying and heavy oil spraying.

Accordingly, in the prior system wherein the oxygen-containing gas (an air-like gas) being supplied to the gasifying furnace is boosted by one booster, it is necessary to boost the whole air, inclusive of the secondary air, to a maximum pressure required to operate the gasifying furnace, i.e. the pressure of the primary air.

Further, a wet-type slurry supply system, known as one coal supply system is, inferior to a dry-type supply system, which is small in moisture evaporation and in latent heat loss. A heavy oil supply system using a steam spray is inferior in thermal efficiency to an air spray system (which is small in energy). Such known systems are defective in that the pressure loss of a coal or heavy oil supply line is large, and thus the plant-home power of the booster must be increased.

Generally, as the primary air, about 25% of air supplied to the gasifying furnace is used.

SUMMARY OF THE INVENTION

It is an object of the present invention to provide a gasification-type combined power generating plant which needs decreased power to boost primary and secondary air, increases the recovered heat of the primary and secondary air, and enhances the overall efficiency of the plant.

To accomplish the foregoing object, the present invention provides:

(1) A gasification-type combined electric power generating plant comprising a gasifying furnace for partially oxidizing a carbon-containing fuel such as coal or heavy oil under high-temperature and high-pressure conditions using an oxygen-containing gas such as air-like gas, a heat exchanger for recovering the sensible heat of a high-temperature fuel gas generated in the gasifying furnace, a gas purifying device for eliminating minor pollutive gas components and dust out of the fuel gas passed through the heat exchanger, a gas turbine driven upon combustion of the gas purified in the gas purifying device, and a gas turbine compressor connected to the gas turbine, including a regenerative heat exchanger for cooling an air-like gas bled from the gas turbine compressor. A cooler is provided for cooling the air-like gas passed through the regenerative heat exchanger, a primary air booster for boosting a part of the air-like gas passed through the cooler to deliver a primary air, a secondary air booster for boosting the remainder of the air-like gas passed through the cooler to deliver a secondary air, and a passage through which the secondary air passed through the secondary air booster is supplied to the regenerative heat exchanger, where the secondary air is heated and then passed to the gasifying furnace.

(2) The gasification-type combined electric power generating plant of item (1) further includes a starting compressor connected to the passage between the gas turbine compressor and the regenerative heat exchanger for delivering a compressed air for starting of the gasifying furnace, and passage switching means interposed between the starting compressor and that passage.

(3) The gasification-type combined electric power generating plant of item (1) further includes two antisurge control lines provided individually for the primary air booster and the secondary air booster, each including an air cooler and a flow regulating valve and allowing the air-like gas to circulate from the vicinity of the air outlet of the booster toward the vicinity of the air inlet thereof.

In the description of items (1) through (3), "air-like gas" means air, oxygen-enriched air, oxygen-containing gas, and the like.

As will be appreciated, in the plant of item (1) above, the air-like gas bled from the turbine compressor is cooled in the regenerative heat exchanger and in the cooler, and divided into two kinds of air: the primary air and the secondary air. The primary air and the secondary air are boosted individually by the primary air booster and the secondary air booster to desired pressures. Therefore the power loss is decreased as compared to the conventional plant wherein the whole air is boosted by one booster to a maximum pressure.

Since the air-like gas passed through the secondary air booster is heated in the regenerative heat exchanger and then sent to the gasifying furnace, the efficiency of heat recovery is increased. That is, since the secondary air boosted by the secondary air booster is used in the regenerative heat exchanger as a medium for cooling of the air-like gas from the turbine compressor, not yet boosted, the range of recovery temperature is high. Thus, the efficiency of energy use, i.e. the energy is high as compared to the conventional plant, wherein the recovery temperature is low because cooling is performed using condensed water or cooling water. That is, since regenerative cycling is effectively formed around the booster due to the presence of the regenerative heat exchanger with the secondary air, the plant efficiency is remarkably high as compared to the conventional system. The reason is that the efficiency of the gasifying furnace and the power generation efficiency of the gas turbine of the conventional plant, where cooling is performed using low-pressure feed water and heating is performed by turbine bleeding, are reserved in the present invention. Further the efficiency of bottom cycle is held high, the energy is prevented from decreasing much, and the efficiency of the plant cycle is preserved, because heat exchange is performed between the air bled from the gas turbine and the secondary air.

The plant of item (2) based on item (1) additionally includes the starting compressor connected to the passage between the gas turbine compressor and the regenerative heat exchanger for delivering a compressed air for starting of the gasifying furnace, and a passage switching means interposed between the starting compressor and that passage. Therefore, the starting compressor can be operated in series with the primary air booster and the secondary air booster and the pressure of the starting compressor is sufficient if it is boosted to a predetermined level at the inlet of each booster. Thus, the pressure ratio of the compressor can be decreased. That is, the power loss is decreased.

Further, since the temperature of the secondary air is increased in the regenerative heat exchanger, any steam source for the start-up operation is not necessary.

Further, by providing a blow-off facility in connection with the passage switching means, the pressure difference is decreased down to a predetermined level at the inlet of each air booster.

The plant of item (3), based on item (1), additionally includes the two antisurge control lines provided individually for the primary air booster and the secondary air booster, each including an air cooler and a flow regulating valve, and allowing the air-like gas to circulate from the vicinity of the air outlet of the booster toward the vicinity of the air inlet thereof. Therefore, when surging occurs at the start-up of the plant due to, for example, a shortage of air flowing into the primary air booster and the secondary air booster, each flow regulating valve is adequately opened to circulate the air-like gas, whereby surging can be prevented.

DESCRIPTION OF THE PREFERRED EMBODIMENTS

Figure 3:
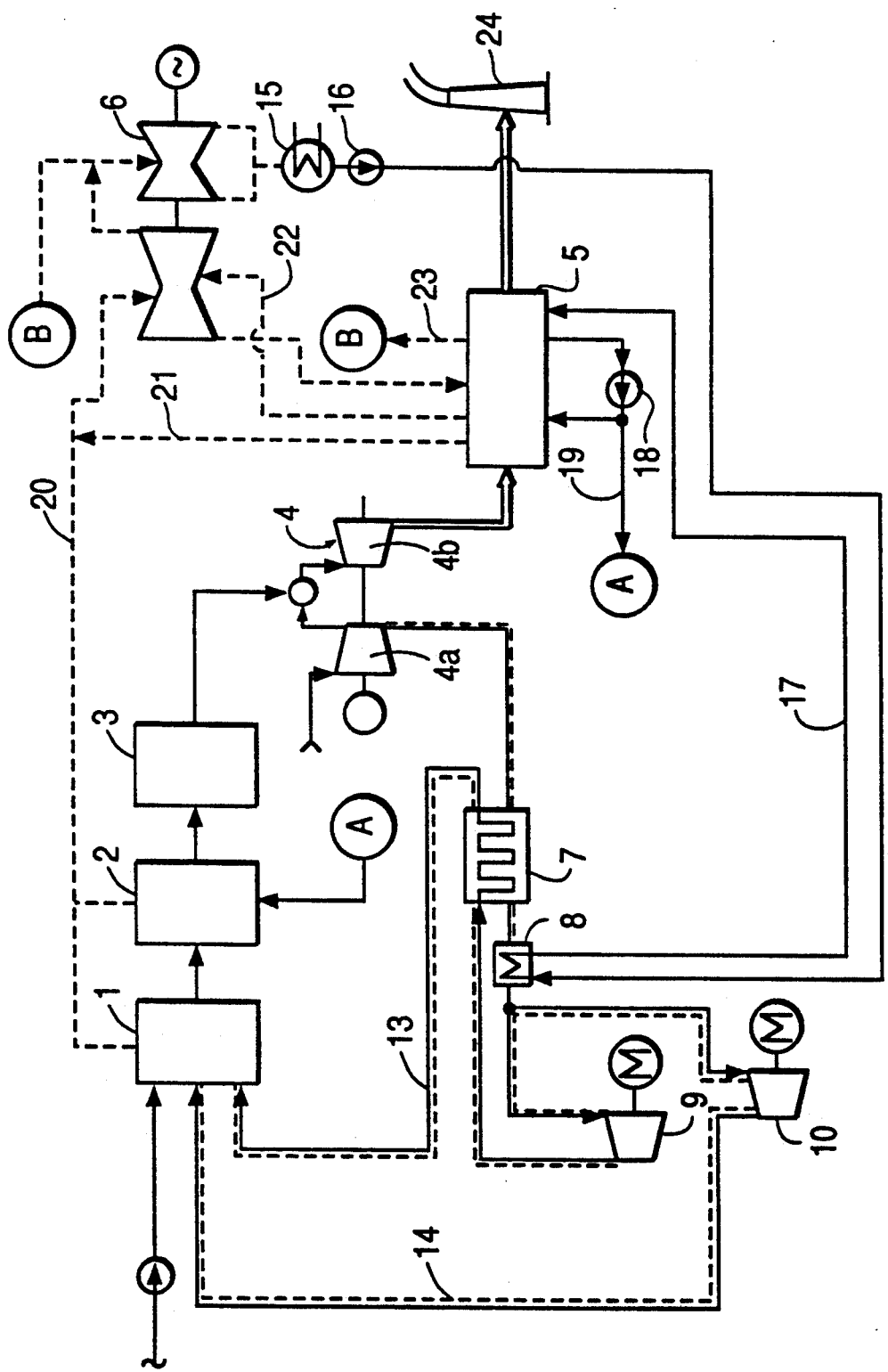
FIG. 3 is a schematic block diagram showing a third embodiment of the gasification-type combined electric power generating plant according to the present invention.
Figure 4:
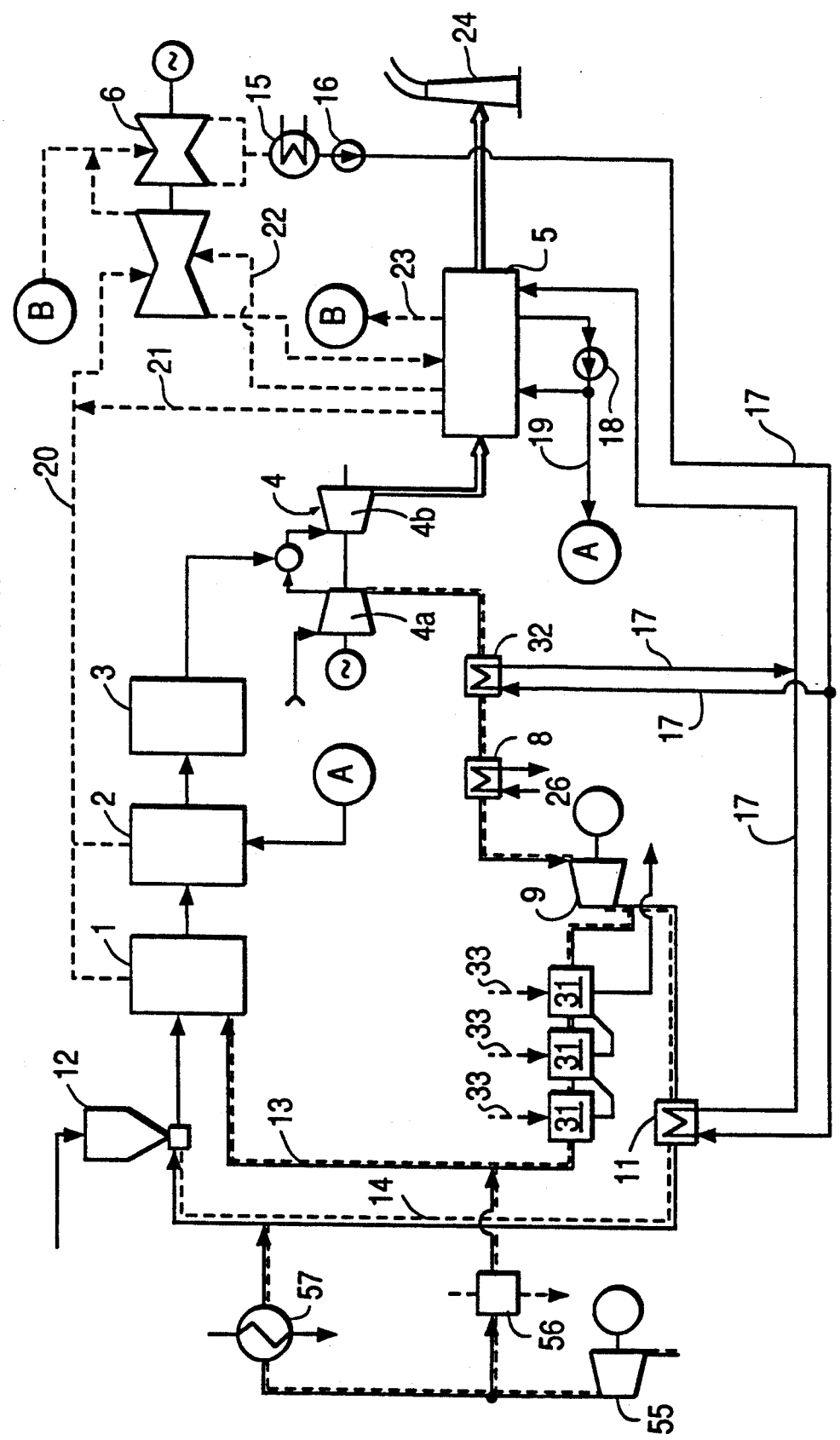
FIG. 4 is a schematic block diagram showing a conventional gasification-type combined electric power generating plant.

Three embodiments of the present invention will now be described with reference to FIGS. 1 through 3. In these embodiments, components corresponding either mutually or to those shown in FIG. 4 are designated by the same reference numerals and will not be described later unless necessary.

A first embodiment of a gasification-type combined electric power generating plant according to the present invention (which corresponds to the subject matter of claim 1) will be described with reference to FIG. 1. This plant uses coal (powdered coal) as fuel.

Figure 1:
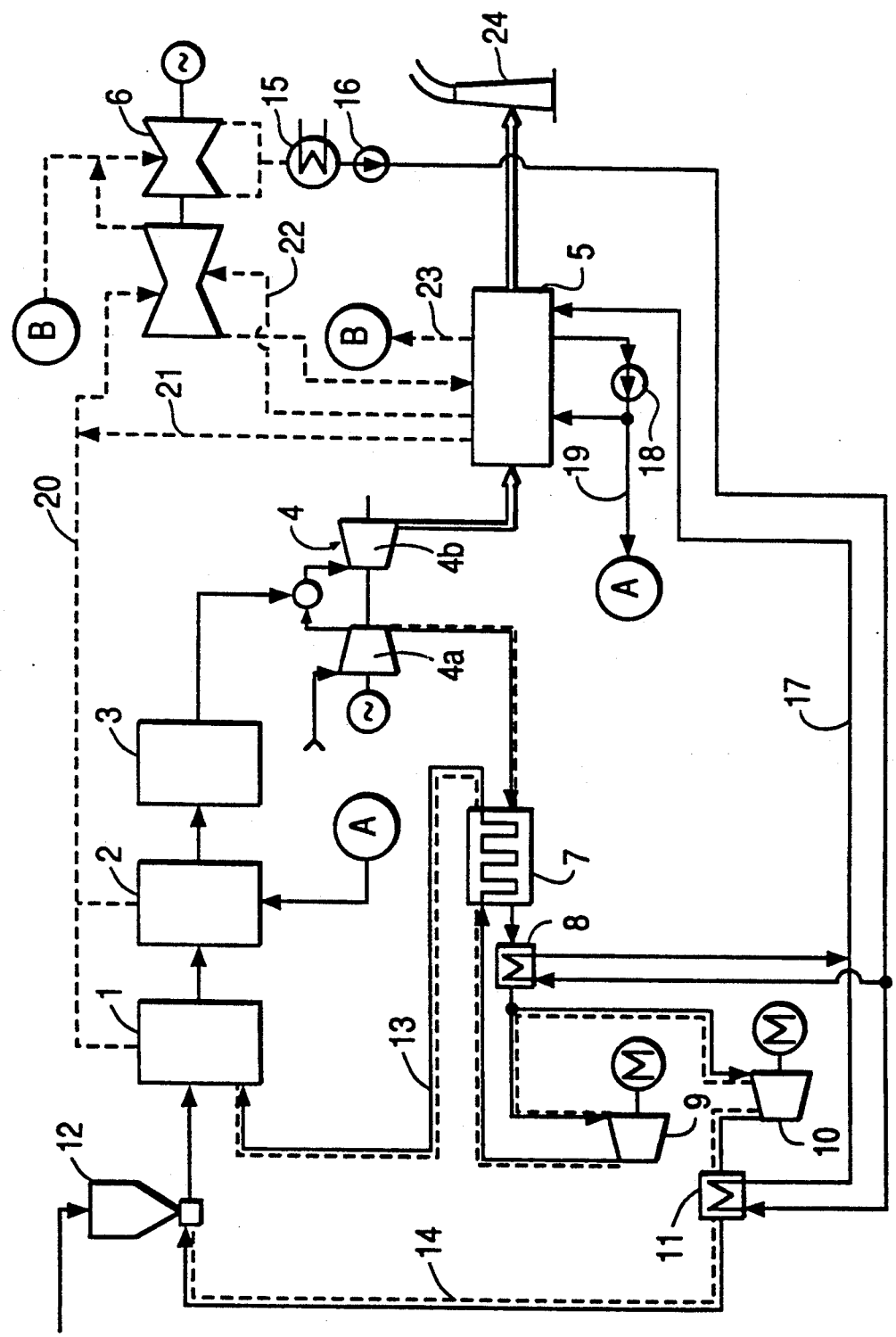
FIG. 1 is a schematic block diagram showing a first embodiment of a gasification-type combined electric power generating plant according to the present invention.

In FIG. 1, 7 is a regenerative heat exchanger provided midway in a passage for supply of the air bled from a gas turbine compressor 4a to a primary air booster 10 and a secondary air booster 9, 8 an air cooler for cooling the air from the regenerative heat exchanger 7, 9 the secondary air booster for boosting a part of the air from the air cooler 8 and supplying the air to a gasifying furnace 1 as secondary air 13, 10 the primary air booster for boosting the remainder of the air from the cooler 8 and supplying the air to the gasifying furnace 1, specifically, to the outlet of a coal supply device 12 as primary air 14, and 11 a primary air cooler for cooling the primary air 14 from the primary air booster 10. The other configurations are substantially identical with those of the conventional plant.

The operation of the first embodiment will be described.

The air (inclusive of gasifying agent, oxygen-containing gas, etc.) being supplied to the gasifying furnace 1 is bled from the gas turbine compressor 4a and boosted by the primary air booster 10 and the secondary air booster 9 to corresponding predetermined pressures for use as the primary air 14 and the secondary air 13 in the gasifying furnace 1. The primary air 14 serves to convey and throw the pulverized coal from a coal supply device 12 into the gasifying furnace 1. The coal (combustible fuel) reacts with oxygen in the gas so that it oxidizes itself and rises in temperature. Since the rate of temperature rise (° C/h) is faster for higher pressures and higher temperatures, under high-pressure conditions it is necessary to decrease the oxygen concentration of the conveyor gas, or the primary air 14, or decrease the temperature of the conveying gas. From this point of view, in FIG. 1, the primary air 14 serving as the conveying gas is controlled by the primary air cooler 11 provided at the outlet of the primary air booster 10 to a temperature of 50° to 80° C. Generally, a pulverized coal conveyor line handles a solid-gas two-phase stream and causes a large pressure loss for the purpose of ensuring a predetermined flow velocity. Therefore, the primary air must be under low-temperature and high-pressure conditions.

On the other hand, to ensure stable combustibility in the gasifying furnace 1 and enhance the efficiency of gasification, it is desirable that the secondary air 13 be high in temperature. The pressure loss which the secondary air 13 encounters includes piping loss, control valve loss, burner loss, etc., and is smaller than that of the primary air 14. Therefore, it is required that the secondary air 13 have a high temperature and a pressure higher than the pressure of the gasifying furnace 1 by a few Kg/cm$^2$.

In this embodiment, to meet the foregoing two requirements and attain optimal plant performance and plant-home power reduction, the primary air 14 and the secondary air 13 are boosted individually by the primary air booster 10 and the secondary air booster 9 to corresponding predetermined pressures.

Further, the high-temperature air bled from the gas turbine compressor 4a is subjected in the regenerative heat exchanger 7 to heat exchange with the low-temperature secondary air at the outlet of the secondary air booster 9 so that the secondary air becomes high in temperature. This high-temperature secondary air ensures combustion stability in the gasifying furnace 1, increases incoming heat, and improves the efficiency of gasification.

A second embodiment according to the present invention will be described with reference to FIG. 2.

Figure 2:
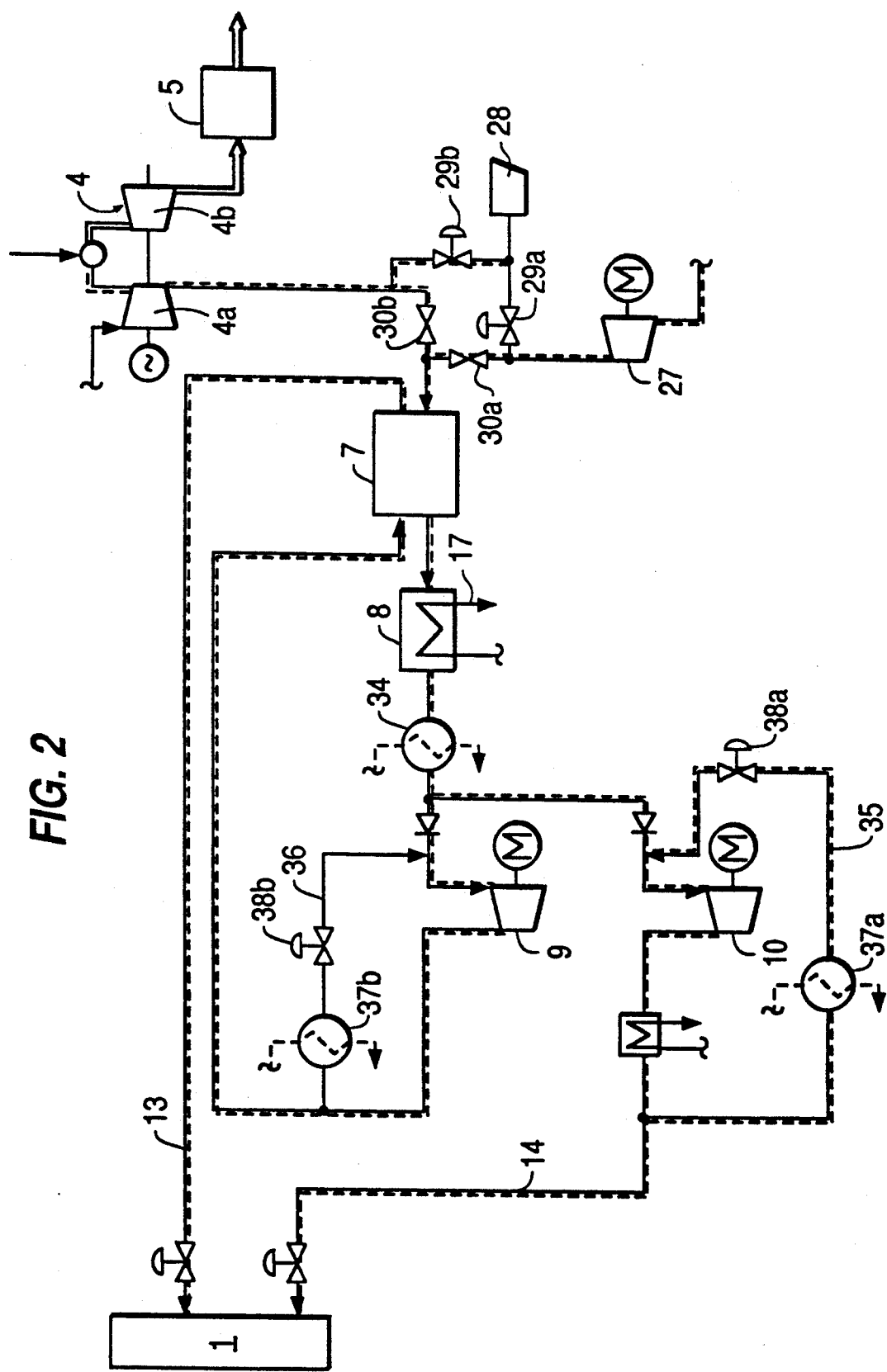
FIG. 2 is a schematic block diagram showing a second embodiment of the gasification-type combined electric power generating plant according to the present invention.

In FIG. 2, 27 is a starting compressor for supplying compressed air (used to start the gasifying furnace) which is connected to the passage between the gas turbine compressor 4a and the regenerative heat exchanger 7, 28 a blow-off muffler for eliminating noise generated when blowing the compressed air off, 29a and 29b blow-off valves actuated when blowing the air off from the bleed passages of the gas turbine compressor 4a and the starting compressor 27, 30a and 30b selector valves provided between the gas turbine compressor 4a, the regenerative heat exchanger 7 and the starting compressor 27, 34 an air cooler provided at the outlet of the air cooler 8, 35 an antisurge control line for circulating the air from the vicinity of the air outlet of the primary air booster 10 toward the vicinity of the air inlet thereof, 36 another antisurge control line for circulating the air from the vicinity of the air outlet of the secondary air booster 9 toward the vicinity of the air inlet thereof, 37a and 37b air coolers provided individually in the antisurge control lines 35 and 36, and, 38a and 38b flow regulating valves provided individually in the antisurge control lines 35 and 36. An exhaust heat recovering boiler and a steam turbine driven by steam generated in the heat recovering boiler are provided on the downstream side of the gas turbine as shown in FIG. 4, though they are not shown in FIG. 2.

The operation of the second embodiment will be described. The air bled from the gas turbine compressor 4a is cooled by the air cooler 8 (using a low-pressure feed water 17 as a cooling medium) and the air cooler 34 (using a bearing cooling water of constant temperature as a cooling medium) provided between the generative heat exchanger 7 and the secondary air booster 9 and the primary air booster 10. This reduction of air temperature decreases the power of the secondary air booster 9 and of the primary air booster 10.

At the time of start-up, the starting compressor 27 connected to the passage between the gas turbine compressor 4a and the regenerative heat exchanger 7 can operate in series with the secondary air booster 9 and the primary air booster 10. That is, the plant is started with the selector valve 30a opened, the selector valve 30b closed, and the blow-off valve 29a closed. When the gasifying furnace 1 takes load and the gas turbine 4 becomes self-sustainable, the bleeding of the gas turbine compressor 4a is started. Specifically, this switching to the bleeding is implemented by gradually opening the blow-off valve 29a and the selector valve 30b while keeping the blow-off valve 29b in the blowing-off state. When the switching is to be terminated, the selector valve 30a is closed, the blow-off valve 29b is closed, and the blow-off valve 29a is closed upon stopping of the starting compressor 27.

Although the total quantity of air being supplied to the gasifying furnace 1 is controlled depending on plant load, the primary air 14 and the secondary air 13 are individually controlled in accordance with operating conditions. In operation, to prevent surging of the secondary air booster 9 and the primary air booster 10, the antisurge control lines 35 and 36 are put in operation. That is, the flow regulating valves 38a and 38b are adequately opened. As a result, the air is satisfactorily circulated toward the air inlet the secondary air booster 9 and of the primary air booster 10, this surge preventing caused by air peeling from a vane surface or the like. The air coolers 37a and 37b cool the circulating air to decrease the power loss of the primary air booster 10 and the secondary air booster 9.

A third embodiment according to the present invention will be described with reference to FIG. 3. Contrary to the first embodiment, which uses coal (powdered coal) as fuel and includes the coal supply device 12, this third embodiment uses liquid fuel. In FIG. 3, 25 is a liquid fuel spray pump for supplying liquid fuel into the gasifying furnace 1. The other configurations are identical with those of the structure of FIG. 1, excluding the coal supply device 12.

In the third embodiment, heavy oil, for example, is sprayed together with the primary air 14 from the liquid fuel spray pump 25 into the gasifying furnace 1.

It should be noted that the second embodiment can be modified as to use liquid fuel.

As described above, in the first and second embodiments, the secondary air boosted by the secondary air booster 9 and sent toward the gasifying furnace 1 is used as the cooling medium of the regenerative heat exchanger 7 for cooling the air sent from the gas turbine compressor 4a toward the primary air booster 10 and the secondary air booster 9. Thus, the thermal efficiency of the plant is improved.

Further, since the primary air 14 and the secondary air 13 are boosted individually by the primary air booster 10 and the secondary air booster 9, each air can be boosted to a desired or required pressure, this wasting no power as compared to the conventional plant wherein one booster is used to boost the whole air to a high pressure required for the primary air. Thus, the power loss can be decreased.

Further, since the starting compressor 27 is connected to the passage between the gas turbine compressor 4a and the regenerative heat exchanger 7 with interposition of the blow-off valves 29a and 29b and the selector valves 30a and 30b and since the blow-off muffler 28 is included, the starting compressor 27 can be started under compatible conditions with a predetermined pressure relating to each of the primary air booster 10 and the secondary air booster 9. Thus, power loss can be decreased.

Further, since at the time of start-up the temperature of the secondary air is increased by the regenerative heat exchanger, any starting steam source is not necessary.

Further, since the antisurge control lines 35 and 36 are provided individually for the primary air booster 10 and the secondary air booster 9 from the air outlet toward the air inlet, surging which would arise at the start-up of the plant can be effectively suppressed.

The foregoing advantages are also provided from the third embodiment even if the fuel is changed to liquid fuel.

Accordingly, the present invention provides the following effects:

Since the thermal efficiency is improved and the power consumed in the plant is decreased, the plant efficiency of the gasification-type combined electric power generating plant is improved.

The plant needs no auxiliary steam source for the start-up operation.

It should be noted that in the gasification-type combined electric power generating plant of the present invention, the plant efficiency at the end of power generation is improved by about 2%, the power of the primary air booster, secondary air booster and accessories is decreased by 0.4%, and the pressure ratio of the starting compressor in the start-up facility is decreased to about 50%.

What is claimed is:

1. A gasification-type combined electric power generating plant comprising a gasifying furnace for partially oxidizing a carbon-containing fuel under high-temperature and high-pressure conditions using an oxygen-containing gas, a heat exchanger for recovering the sensible heat of a high-temperature fuel gas generated in the gasifying furnace, a gas purifying device for eliminating minor pollutive gas components and dust out of the fuel gas passed through the heat exchanger, a gas turbine driven upon combustion of the gas purified in the gas purifying device, a gas turbine compressor connected to the gas turbine, an exhaust heat recovering boiler for recovering heat from high-temperature gas at the outlet of the gas turbine, and a steam turbine driven by steam generated by the recovered heat, said gasification-type combined power generating plant further including:

a regenerative heat exchanger which cools oxygen-containing gas bled from the gas turbine compressor, a cooler which cools the oxygen-containing gas from said regenerative heat exchanger, a primary air booster which boosts a part of the oxygen-containing gas from said cooler to deliver a primary air, a secondary air booster which boosts the remainder of the oxygen-containing gas from said cooler to deliver a secondary air, and a passage through which the secondary air from said secondary air booster is supplied to said regenerative heat exchanger, whereat the secondary air is heated and then passed to the gasifying furnace.

2. A gasification-type combined electric power generating plant according to claim 1, further including a starting compressor connected to a passage between said gas turbine compressor and said regenerative heat exchanger for delivering compressed air for starting of the gasifying furnace, and a passage switching means interposed between said starting compressor and said passage for switching between said gas turbine compressor being connected with said regenerative heat exchanger and said starting compressor being connected with said regenerative heat exchanger.

3. A gasification-type combined electric power generating plant according to claim 1, further including two antisurge control lines provided individually for said primary air booster and said secondary air booster, each including an air cooler and a flow regulating valve and allowing the oxygen-containing gas to circulate from the vicinity of an air outlet of each said booster toward the vicinity of an air inlet thereof.

* * * * *